3,094,455
NOVEL CHLORINATED ETHYL SULFONES
James Forrest Allen, Pennington, and Harold K. Latourette, Hopewell Township, N.J., assignors to FMC Corporation, a corporation of Delaware
No Drawing. Filed June 20, 1961, Ser. No. 118,248
8 Claims. (Cl. 167—22)

This invention relates to novel sulfones and more particularly to new chlorinated sulfones useful as fungicides.

The novel compounds of this invention are 2-hydroxyethyl 2-chloroethyl sulfone and acyloxy derivatives thereof. These new sulfones are useful as plant fungicides, especially in overcoming the effect of bean rust and cucumber anthracnose.

The 2-hydroxyethyl 2-chloroethyl sulfone may be prepared by the reaction of bis(2-hydroxyethyl)sulfide and chlorine in the presence of water. Bis(2-hydroxyethyl)-sulfoxide and chlorine can also be reacted to form the novel sulfone. The reaction medium may then be water, or an organic medium containing water, or an anhydrous medium.

Bis(2-hydroxyethyl)sulfide is produced in a known manner from hydrogen sulfide and ethylene oxide. The sulfide is dissolved in water or in a solvent for the sulfide containing at least one mole of water per mole of sulfide. Chlorine gas is passed into the solution at a suitable rate, while the temperature is maintained within the desired range. Chlorination is stopped when free chlorine is detected at the surface of the solution. Even at low temperatures, this reaction is very rapid. A high yield of colorless, high boiling, liquid 2-hydroxyethyl 2-chloroethyl sulfone is obtained and may be separated from the solvent by vacuum distillation.

It is believed that the reaction described above proceeds as follows:

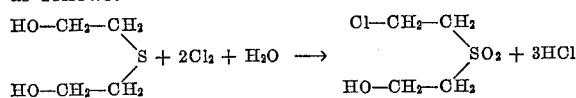

When the sulfoxide is used as the starting reactant, complete oxidation to the sulfone is possible without the presence of water:

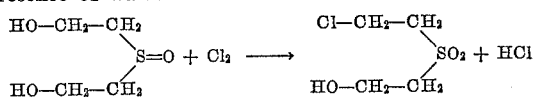

Because of the remaining free hydroxide group in the product, the sulfone can be acylated to esters which also possess fungicidal characteristics. If the ester derivative is preferred directly, a variation of the chlorination reaction may be employed. A mixture of the sulfoxide and the acid having the desired acyl group is first prepared. Chlorine is then passed into this mixture to form 2-acyloxyethyl 2-chloroethyl sulfone.

In the reaction between chlorine and the sulfide, one mole of water per mole of bis(2-hydroxyethyl)sulfide is required to complete the reaction. It is desirable, however, to have the water-sulfide ratio greater than one for the purpose of dilution of the reaction mass. Many organic solvents may be used as diluents in place of water; satisfactory solvents include the lower aliphatic alcohols, chlorinated hydrocarbons in which the sulfide is soluble, such as methylene chloride and chloroform, or other solvents which are not susceptible to chlorination.

The sulfoxide reaction requires no other source of oxygen than from the hydroxyl radical, so that other media besides water can be selected, e.g. chloroform, using sufficient solvent to ensure solution of the sulfoxide.

The reaction mass is maintained at a temperature range of 0° to 35° C. Below 0° C., the reaction rate is relatively slow, and the chlorination, therefore, requires a longer time. Above 35° C., the hydrogen chloride by-product can react with alcoholic hydroxyl groups of both starting material and product, thus lowering the yield by the formation of side-products. It is preferred in this invention to operate the reaction at 15° to 20° C. The low-boiling material including solvent, unreacted water, and HCl can then be removed from the product by distillation. The crude product remaining may be further purified by high-vacuum distillation.

In the acylation step, the sulfone is mixed with an acylating agent, such as an anhydride, acid chloride, or carboxylic acid. The mixture is heated to a temperature between 75° to 100° C., and maintained at this temperature until the reaction is complete. When a weak acylating agent, such as a carboxylic acid, is used, it is generally desirable to add small quantities of a promoter, such as a mineral acid like sulfuric. The yields in these reactions are generally high.

The following examples are illustrative of the invention.

*Example I.—Preparation of 2-Hydroxyethyl 2-Chloroethyl Sulfone*

A mixture of 122 g. (1 mole) of bis(2-hydroxyethyl) sulfide and 72 g. (4 moles) of water was agitated and then cooled to 15° C. Chlorine gas was introduced into the stirred mixture at a temperature between 15° and 20° C. until the mixture had a persistant yellow color. Excess water and hydrogen chloride were removed in vacuo on a boiling water bath. One hundred seventy-two grams (100% yield) of colorless, moderately viscous, crude product was collected and distilled. Boiling point 159° to 162° C., at 0.35 mm.; $n_D^{25}$, 1.5010.

*Analysis.*—Calcd. for $C_4H_9ClO_3S$: Cl, 20.5%; S, 18.6%. Found: Cl, 20.6%; S, 18.8%.

*Example II.—Chlorination of Bis-(2-Hydroxyethyl)Sulfoxide*

Into a solution containing 83 g. of water and 138 g. (1 mole) of bis(2-hydroxyethyl)sulfoxide was added chlorine with sufficient cooling to maintain the temperature at 25° to 35° C. Using the same end point as in Example I, the gas flow was discontinued and water and hydrogen chloride were removed in vacuo. The yield of 2-hydroxyethyl 2-chloroethyl sulfone was 172.5 g. (100% yield).

*Analysis.*—Calcd. for $C_4H_9ClO_3S$: Cl, 20.5%; S, 18.5%. Found: Cl, 20.7%; S, 18.4%.

*Example III.—Preparation of 2-Acetoxyethyl 2-Chloroethyl Sulfone*

One hundred seventy-two grams (1.0 mole) of 2-hydroxyethyl 2-chloroethyl sulfone, 112 g. (1.1 moles) of acetic anhydride and two drops of sulfuric acid were mixed together. The temperature rose from 30° to 44° C. The reactants were then heated to 100° C. for 30 minutes. One hundred thirty-three grams (62% yield) of product was distilled at 156° to 162° C., at 1.2 mm.

*Analysis.*—Calcd. for $C_6H_{11}ClO_4S$: Cl, 16.5%; S, 14.9%. Found: Cl, 16.7%; S, 14.9%.

*Example IV*

The following data show the fungicidal utility of the new compositions of this invention. In this field test, ¼- and ⅛-lb. samples of each of the compounds were dissolved in 100 gal. of water. Plant subjects were sprayed with these solutions until the liquid began to run off the leaves. The test plants were allowed to dry, and solutions containing a fungus were sprayed on them and on untreated plants.

The results are percentages of the degree of effectiveness of the sulfones against the action of fungus on treated plants with respect to untreated plants. They are calculated as follows:

$$\text{Percent fungicidal effect} = \frac{Du-Dt}{Du} \times 100\%$$

where $Du$ is percent of untreated plants destroyed and $Dt$ is percent of treated plants destroyed.

| Compound Tested | Fungus | | | |
| --- | --- | --- | --- | --- |
| | Bean Rust | | Cucumber Anthracnose | |
| | ¼ | ⅛ | ¼ | ⅛ |
| 2-Hydroxyethyl 2-Chloroethyl Sulfone | 91 | 2 | 94 | 0 |
| 2-Acetoxyethyl 2-Chloroethyl Sulfone | 100 | 74 | 100 | 11 |

These sulfones, being water-soluble, may conveniently be applied in a water solution to the plants. Wetting agents and preservatives may be added to the solution to ensure suitable coverage when sprayed or otherwise applied to the surfaces of the plants. Generally, but not critically, the concentration of the active ingredient in solution may be one-eighth to one-quarter of a pound per 100 gallons of water, and preferably one-quarter. The concentration may vary outside this range depending upon the desired results. The active ingredient may also be conveniently compounded into a wettable powder, which may be subsequently dispersed in water prior to application.

Having fully described our invention, we claim:
1. 2-hydroxyethyl 2-chloroethyl sulfone.
2. 2-acetoxyethyl 2-chloroethyl sulfone.
3. Method of preparing 2-hydroxyethyl 2-chloroethyl sulfone comprising preparing a solution of bis(2-hydroxyethyl) sulfide in a solvent, said solution containing at least 1 mole of water per mole of sulfide, introducing chlorine gas into the solution to provide at least 2 moles of chlorine per mole of sulfide, at a temperature of 0° to 35° C. and distilling off the solvent, unreacted water, and by-product.
4. Method of claim 3 in which the solvent is water.
5. Method of claim 3 in which the temperature is 15° to 20° C.
6. Method of preparing 2-hydroxyethyl 2-chloroethyl sulfone comprising preparing a solution of bis(2-hydroxyethyl) sulfoxide in a solvent, introducing chlorine gas into the solution to provide at least 1 mole of chlorine per mole of sulfide, at a temperature of 0° to 35° C. and distilling off the solvent and by-product.
7. A fungicidal composition comprising ⅛ to ¼ of a pound of 2-hydroxyethyl 2-chloroethyl sulfone as the active ingredient and 100 gallons of water.
8. A fungicidal composition comprising ⅛ to ¼ of a pound of 2-acetoxyethyl 2-chloroethyl sulfone as the active ingredient and 100 gallons of water.

References Cited in the file of this patent

FOREIGN PATENTS 887,505 Germany _____ Aug. 24, 1953

OTHER REFERENCES

Cashmore, J. Chem. Soc. (London) 123, 1738–1745 (1923).